No. 807,642. PATENTED DEC. 19, 1905.
W. S. SIDES & J. P. KLENSCH.
SOLAR HEATER.
APPLICATION FILED APR. 3, 1905.
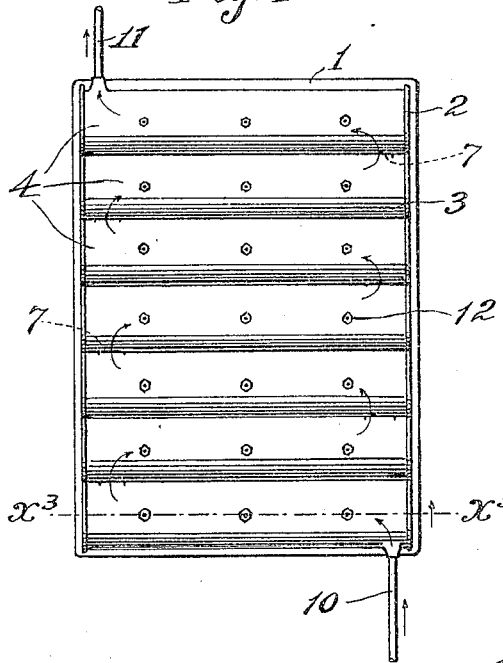
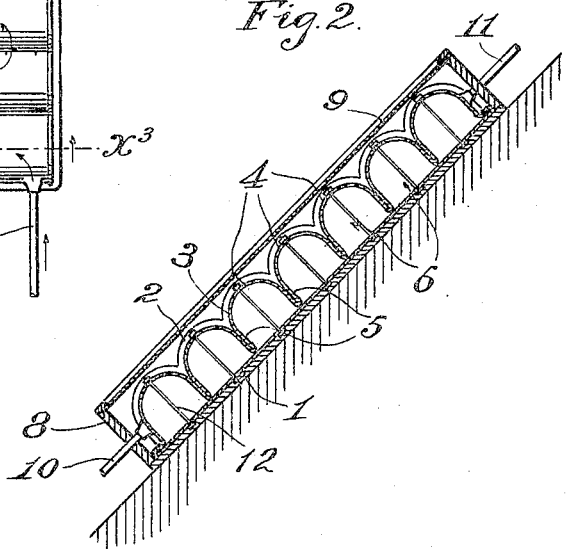
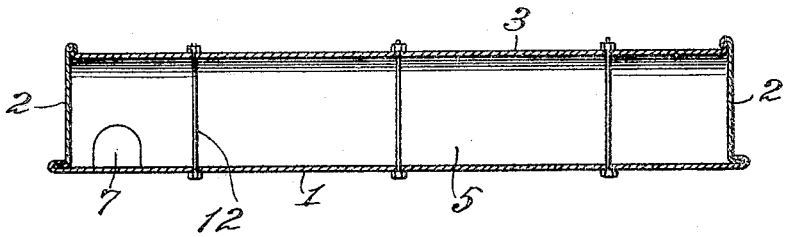
Witnesses:
Inventors:
William S. Sides
John P. Klensch

UNITED STATES PATENT OFFICE.

WILLIAM S. SIDES AND JOHN P. KLENSCH, OF COVINA, CALIFORNIA.

SOLAR HEATER.

No. 807,642.  Specification of Letters Patent.  Patented Dec. 19, 1905.

Application filed April 3, 1905. Serial No. 253,441.

*To all whom it may concern:*

Be it known that we, WILLIAM S. SIDES and JOHN P. KLENSCH, citizens of the United States, residing at Covina, in the county of Los Angeles, State of California, have invented a new and useful Solar Heater, of which the following is a specification.

This invention relates to solar heaters; and the main object of the invention is to provide a device of the character described which is very simple in construction, durable in use, and which will quickly heat the water to a relatively high degree by the sun's rays.

The accompanying drawings illustrate the invention, and, referring thereto, Figure 1 is a plan view of the invention. Fig. 2 is a cross-section through the invention, showing it housed within a glass-covered box and inclined in the usual position. Fig. 3 is a sectional view, enlarged, on the line $X^3 X^3$ in Fig. 1.

The device comprises a box, preferably formed of sheet metal, the top of the box being corrugated to present a series of convex surfaces, the interior of the box being divided by partitions into several intercommunicating chambers for securing the proper circulation of water through the box.

The box comprises a bottom 1, to which are attached side walls 2. The top 3 is fastened to the side walls and is corrugated to form a plurality of parallel convex surfaces 4, the top of the box being folded or lapped at intervals to form partitions 5, which extend parallel with the convex surfaces 4. The corrugated top 3, with partitions 5, is formed, preferably, from a single piece of sheet metal. The partitions 5 touch the bottom, but are not fastened thereto, and thus form a series of chambers 6, each of which lies immediately under a convex portion 4. The chambers 6 have communication through passages or notches 7, formed in the partitions 5, being staggered, as indicated in Fig. 1, so that the water in passing through the heater will pass back and forth across the heater through the chambers 6, as indicated by the arrows in Fig. 1.

The heater is preferably arranged, as shown in Fig. 2, in an inclined position, so that the convex surfaces 4 are presented to the sun's rays, and the device is preferably inclosed in a box 8, having a transparent top 9, which serves to maintain an even temperature within the box and yet allow the sun's rays to penetrate to the convex surfaces, the box serving to conserve the heat in its interior.

The extreme chamber 6 at the lower side of the box is provided with a water-inlet pipe 10, while the other extreme chamber 6 at the top of the box is provided with an outlet-pipe 11.

The convex faces present a greater area of surface for the absorption of heat than a perfectly flat surface, and therefore a greater amount of heat is imparted by conduction from the relatively large area of heated metal to the water which is within the heater, and owing to the convex curvature of the exposed face of the corrugations the rays from the sun strike some portions at least directly during the different positions of the sun with respect to the heater, thus further augmenting the heating effectiveness of the top, and the heat thus received by the top is not only transmitted to the water within the heater by direct conduction, but a great amount of heat is also imparted to the water within the heater by indirect conduction from the corrugations through the partitions 5 to the water. Therefore the partitions 5 serve the double purpose of directing the flow of water through the heater, preventing the incoming water from immediately mingling with the water which has already been heated to a high degree, but also impart heat to the water which they have received by conduction from the corrugated portions.

It is obvious that the temperature of the water will be raised by successive degrees in passing through the chambers, so that by the time it has reached the upper chamber and is ready to pass through the discharge-pipe 11 it is as highly heated as possible.

In order to hold the bases of partitions 5 tightly against the bottom 1, fastening means, preferably galvanized bolts 12, are employed, three of which pass through each chamber 6, as shown in Figs. 3 and 2. Thus the bottom is prevented from springing away from the partitions, and a very strong and rigid structure is secured thereby.

What we claim is—

1. A solar heater comprising a box, the top of which is corrugated to form a plurality of external convex faces, portions of the top being folded between the convex faces to form partitions which extend to the bottom of the box, and bolts connected to the bottom and to the convex portions of the top for holding the top in place with the folded edges of the partitions against the bottom of the box.

2. A solar heater comprising a box, the top of which is corrugated to form a plurality of external convex faces, portions of the top, being folded between the convex faces to form partitions, the partitions extending to the bottom of the box, and fastening means adapted to hold the bases of the partitions against the bottom of said box.

3. A solar heater comprising a box, the top of which is corrugated to form a plurality of external convex faces, portions of the top being folded between the convex faces to form partitions extending to the bottom of the box, each partition having a notch forming a passage for water from one side of the partition to the other.

4. A solar heater comprising a box, the top of which is corrugated to form a plurality of external convex faces, portions of the top being folded between the convex faces to form partitions extending to the bottom of the box, each partition having a notch forming a passage for the water from one side of the partition to the other, the notches in alternate partitions being at one side of the box, and the notches in the other partitions being at the other side of the box.

5. A solar heater comprising a box, the top of which is corrugated to form a plurality of external convex faces, portions of the top being folded between the convex faces to form partitions extending to the bottom of the box, each partition having a notch forming a passage for the water from one side of the partition to the other, the notches in alternate partitions being at one side of the box, and the notches in the other partitions being at the other side of the box, a suitable inlet-pipe for one extreme chamber in the box, and an outlet-pipe for the opposite extreme chamber, the said pipes being located substantially diagonally opposite each other.

In testimony whereof we have hereunto set our hands, at Covina, California, this 25th day of March, 1905.

WILLIAM S. SIDES.
JOHN P. KLENSCH.

In presence of—
F. E. DUDDEROR,
J. M. RUSH.